(12) United States Patent
Reid (10) Patent No.: US 7,476,315 B2
(45) Date of Patent: *Jan. 13, 2009

(54) QUICK-CHANGE FILTER AND BRACKET SYSTEM

(76) Inventor: Roger P. Reid, 1904 Industrial Way, Caldwell, ID (US) 83605

( * ) Notice: Subject to any disclaimer, the term of this patent is extended or adjusted under 35 U.S.C. 154(b) by 0 days.

This patent is subject to a terminal disclaimer.

(21) Appl. No.: 11/682,873

(22) Filed: Mar. 6, 2007

(65) Prior Publication Data

US 2007/0215535 A1 Sep. 20, 2007

Related U.S. Application Data

(63) Continuation of application No. 10/920,780, filed on Aug. 17, 2004, now Pat. No. 7,186,337, which is a continuation of application No. 10/272,416, filed on Oct. 15, 2002, now Pat. No. 6,776,906.

(60) Provisional application No. 60/329,422, filed on Oct. 12, 2001.

(51) Int. Cl.
*B01D 27/08* (2006.01)
*B01D 35/30* (2006.01)
(52) U.S. Cl. .................. 210/232; 210/444; 285/914
(58) Field of Classification Search ............... 210/232, 210/444; 285/914
See application file for complete search history.

(56) References Cited

U.S. PATENT DOCUMENTS

| | | | |
|---|---|---|---|
| 1,999,913 A | 4/1935 | Merritt | 210/440 |
| 3,107,601 A | 10/1963 | Longmire | 99/330 |
| 3,397,135 A | 8/1968 | Otto | 204/276 |
| 3,685,539 A | 8/1972 | Warren | 137/565 |
| 3,753,495 A | 8/1973 | Bjork | 210/206 |
| 3,950,251 A | 4/1976 | Hiller | 210/232 |
| 4,211,439 A | 7/1980 | Moldestad | 285/27 |
| 4,857,191 A | 8/1989 | Wolf | 210/286 |
| 5,092,999 A | 3/1992 | Valenzuela et al. | 210/321.72 |

(Continued)

FOREIGN PATENT DOCUMENTS

AU 200210174 A1 2/2002

(Continued)

*Primary Examiner*—Thomas M Lithgow
(74) *Attorney, Agent, or Firm*—Pedersen & Co., PLLC; Ken J. Pedersen; Barbara S. Pedersen (57) ABSTRACT

A bracket system holds one or more filters in quick-attach and quick-release fashion. Bracket modules are combined in modular fashion, with tubing or other conduit between the modules, to create a "bank" of filters easily changed in number, arrangement, and flow scheme. Preferably, the bracket system comprises pairs of top modules and bottom modules that capture and support the top end and bottom end of a filter. Filter inlet and outlet ports preferably slide onto and off of cooperating tubes or ports in the bracket modules, for installation and removal of the filters onto/from the modules without tools or threaded connections. A top retaining member preferably pivots off of its respective filter, so that the filter may be lifted up off of its respective bottom module. The bottom modules may be pivotal, so that lifting the filter up from the bracket system is facilitated by allowing the filter top end to also pivot out away from the top module. Each filter is preferably substantially vertically and pivotally removable from the bracket system.

3 Claims, 10 Drawing Sheets

U.S. PATENT DOCUMENTS

| | | | |
|---|---|---|---|
| 5,108,598 A | 4/1992 | Posner | 210/232 |
| 5,342,518 A | 8/1994 | Posner et al. | 210/232 |
| 5,397,462 A | 3/1995 | Higashijima et al. | 210/136 |
| 5,651,887 A | 7/1997 | Posner et al. | 210/232 |
| 5,925,245 A | 7/1999 | Bradford et al. | 210/232 |
| 6,080,313 A | 6/2000 | Kelada | 210/631 |
| 6,277,277 B1 | 8/2001 | Jacobi | 210/240 |
| 6,579,455 B1 * | 6/2003 | Muzik et al. | 210/234 |
| 6,776,906 B2 | 8/2004 | Reid | 210/232 |
| 6,843,912 B2 | 1/2005 | Chaney et al. | 210/234 |
| 6,926,826 B2 | 8/2005 | Reid | 210/232 |

FOREIGN PATENT DOCUMENTS

| | | | |
|---|---|---|---|
| DE | 19925297 | 7/2000 | |
| EP | 0 269 054 | 6/1988 | |
| EP | 0 887 100 A1 | 12/1998 | |
| GB | 771968 | 4/1957 | |
| KR | 99086940 A | 12/1999 | 35/30 |
| WO | 01/64312 A1 | 9/2001 | |
| WO | WO 01 83079 | 11/2001 | |

* cited by examiner

SECTION B-B

DETAIL A
SCALE 2.000

FIG. 10

SECTION A-A

DETAIL B
SCALE 2.000

QUICK-CHANGE FILTER AND BRACKET SYSTEM

This is a continuation of patent application Ser. No. 10/920,780, filed Aug. 17, 2004, "Quick-Change Filter and Bracket System", issued on Mar. 6, 2007 as U.S. Pat. No. 7,186,337, which is a continuation of patent application Ser. No. 10/272,416, filed Oct. 15, 2002, entitled "Quick Change Filter and Bracket System," issued on Aug. 17, 2004 as U.S. Pat. No. 6,776,906, which claims priority of Provisional Application Ser. No. 60/329,422, filed Oct. 12, 2001, which was entitled "Quick Change Filter and Bracket System" and which is hereby incorporated by reference.

BACKGROUND OF THE INVENTION

1. Field of the Invention

The present invention relates to brackets and piping manifolds for holding water filters, and more specifically, brackets and manifolds that allow quick change-out of the filters. The invention relates to a bracket system that may accommodate a plurality of filters in series and/or parallel flow, and is adaptable to many different flow schemes, media and liquids. The preferred system used a pivotal system, wherein a top bracket pivots away from each filter so that the filters may be lifted up out of the bracket system.

2. Related Art

Manifold systems have been developed to accommodate multiple filters or water treatment tanks for increasing filter capacity and for allowing quick replacement of the filters. In 1972, Warren disclosed (U.S. Pat. No. 3,685,539) a multi-station system comprising a plurality of filters attached to a vacuum manifold. In 1973, Bjork disclosed (U.S. Pat. No. 3,753,495) a water conditioning unit with a filtering tank and a water softening tank connected to a manifold. In 1992-1994, Posner et al. disclosed a manifold system that comprises horizontally-removable filters that include a "means for effective evenly distributed filtration," which includes a first conical stage filter near the filter inlet and a second conical stage filter near the filter outlet, with a charcoal element between the conical filters. Each Posner filter is removable in a horizontal direction, that is, perpendicularly to the plane of the piping manifold, which plane is typically vertical. The Posner fittings are stationary snap-together and snap-apart connections that are parallel in fixed horizontal planes.

There is still need a filter and bracket system that provides reliable quick connection and disconnection between a plurality of filters and their respective brackets. There is still a need for such a modular system that allows filters to be arranged in many different flow configurations for many different processes. The present invention fulfills these and other needs.

SUMMARY OF THE INVENTION

The present invention comprises a bracket system that holds a filter in quick-release fashion and that may comprise conduits for flow in or out of one or both ends of the filter. The bracket system may be expanded by using a plurality of brackets in modular fashion to create a "bank" of several filters. The invented system therefore features a high degree of flexibility for changing the number of filters and the flowscheme of the filter bank, including flow between two or more filters to a storage or treatment vessel that is separate from the bank of filters.

The bracket system comprises pairs of brackets. Each pair includes a top bracket and a bottom bracket, which capture the top end and bottom end of a filter, respectively. Several pairs of brackets may be positioned near each other to hold a plurality of filters generally side-by-side or in other arrangements. Fittings are included in the brackets for sealing to the inlet and outlet ports of the filters to connect the ports to flexible tubing or other conduit. The conduit extends from the fittings to establish many different flowschemes in and out of the filters and between the filters and/or the separate storage and treatment vessels. Each bracket may be made to include fitting configurations of various types, including:
1. One fitting, that is, a single fitting for attachment to an inlet port or an outlet port;
2. Two fittings, that is, "double fittings" for connection to both an inlet port and an outlet port; or
3. No fittings, wherein the particular bracket, either top or bottom bracket, is intended for support of the filter but not for conducting of fluid.

Single-fitting brackets are placed on both ends of flow-through filters, for example, to allow flow into the filter top end and out of the filter bottom end. Double-fitting brackets are used at one end of a central-return-tube-style filter, preferably the top end, to allow flow in and out of a single end of the filter. For such return-tube filters, the bottom bracket typically contains no fittings or conduit, because the bottom bracket serves only to support and retain the filter. Brackets intended for the various fitting configurations may be made the same or substantially the same, that is, having the basic structure for more than one configuration but having one or more fittings blocked off for use with different filters. For example, a bottom bracket may be formed to have a post that, in some flowschemes, fluidly communicates with a port in the filter, or, in other flowschemes, may have its internal passage blocked and have no attached conduit, so that there is no fluid communication. Or, the filter may have only an indentation in its bottom end rather than a port, so that a post with an internal passage still does not communicate with the internals of the filter.

The brackets preferably serve as support, securement, and quick-connect and quick-disconnect fluid conduit means, so that, preferably, a filter may be installed or removed without tools, without manipulation of threaded members or other screws, bolts, or other fasteners. To fulfill these objects, the preferred top and bottom brackets have slide-together fluid connections and pivotal features that allow the filter to "clear" the brackets during removal. The top brackets are preferably adapted to pivot off of the filters, so that the filters may be lifted up off of the bottom brackets. Additionally, the bottom brackets may be pivotal, so that lifting the filters up from the bracket system is facilitated by allowing the filter to also pivot out away from the top modules. Thus, the top bracket preferably comprises a lid that has a substantial vertical component to its movement, to clamp down over the top filter connection for retaining the filter top in place, and then to move up and away from the top filter connection for removal of the filter. The bottom bracket comprises a base that preferably vertically receives the bottom surface of the filter, and, optionally, a vertical fitting for forming a fluid connection with the bottom of a flow-through filter.

Therefore, the preferred bracket system holds one or more filters in quick-attach and quick-release fashion and includes conduits for flow in and out of one or both ends of the filters. A plurality of bracket modules are combined in modular fashion, with tubing or other conduit between the modules, to create a "bank" of several filters featuring a high degree of flexibility for changing the number and flow scheme of filters, and with tubing or other conduit between filters and the storage or treatment equipment that is separate from the bank of filters. Preferably, the bracket system comprises pairs of top modules and bottom modules that capture and support the top end and bottom end of a filter. A top retaining member preferably pivots off of its respective filter, so that the filter may be lifted up off of its respective bottom module. Additionally, the bottom modules may be pivotal, so that lifting the filter up from the bracket system is facilitated by allowing the filter to also pivot out away from the top module. Thus, the top retaining member has a substantial vertical component to its movement to clamp down over the top filter connection to retain the filter top in place. The bottom bracket comprises a base to vertically support the filter plus, optionally, a fitting for forming a fluid connection with a flow-through filter. Each filter is therefore substantially vertically and pivotally removable from the bracket system.

The especially-preferred embodiments of filter and bracket modules are adapted so that the filter is installed by a simple lifting of a lid, placement of the filter on the bottom bracket, pivoting the filter toward the top bracket to push the top ports onto the bracket tubes, and letting the lid fall down onto the filter top end. Likewise, the especially-preferred filter is removed from the bracket modules by the user lifting the lid and pulling on the top end of the filter to pull the filter off of the top bracket tubes, which causes the filter to pivot slightly away from the top bracket into a position in which the user may then easily lift the filter up off the bottom bracket without any further detachment of parts, fasteners, or moveable members. Thus, the invented system may provide a bank of filters that may quickly be changed out or cleaned or otherwise maintained by even relatively untrained staff.

DESCRIPTION OF THE PREFERRED EMBODIMENTS

Figure 1:
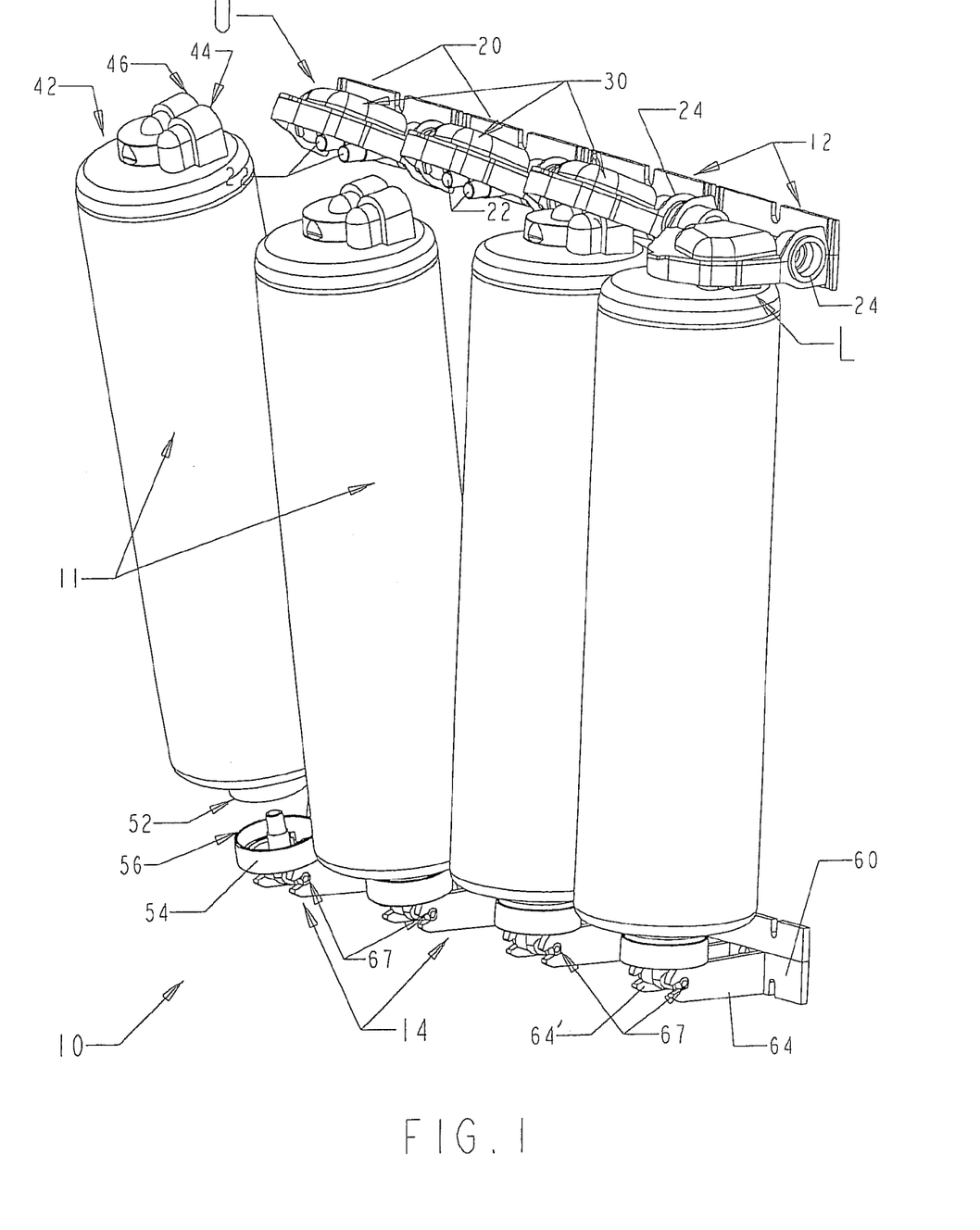
FIG. 1 is a side perspective view of one embodiment of the invention, which comprises four pairs of brackets, with four filters in various stages of removal, the brackets being shown without tubing or other conduit between the brackets.
Figure 2:
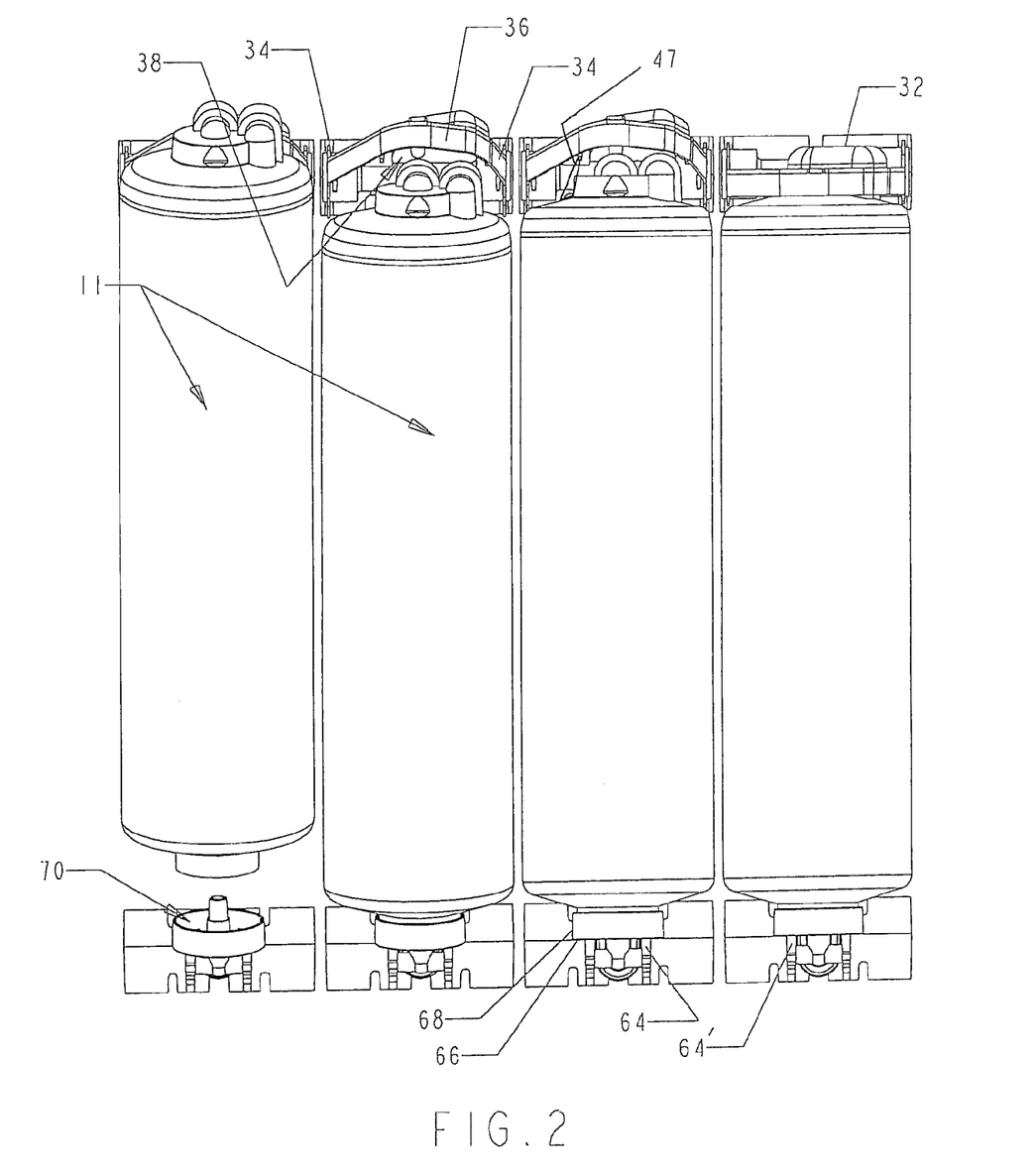
FIG. 2 is a front view of the filters and brackets of FIG. 1.
Figure 3:
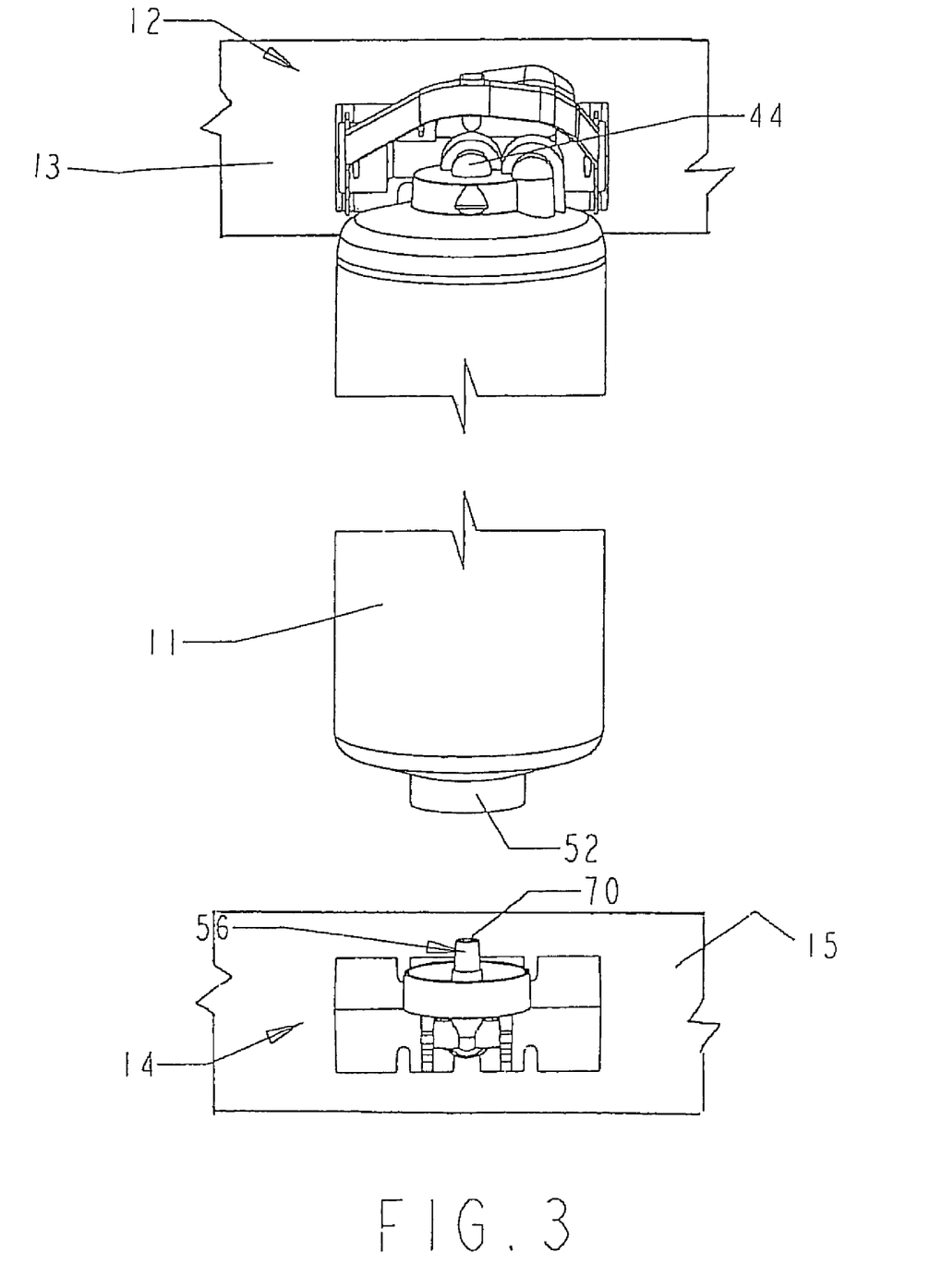
FIG. 3 is a front view of an embodiment of a bottom bracket, filter top, and top bracket for a down-flow filter system.
Figure 5A:
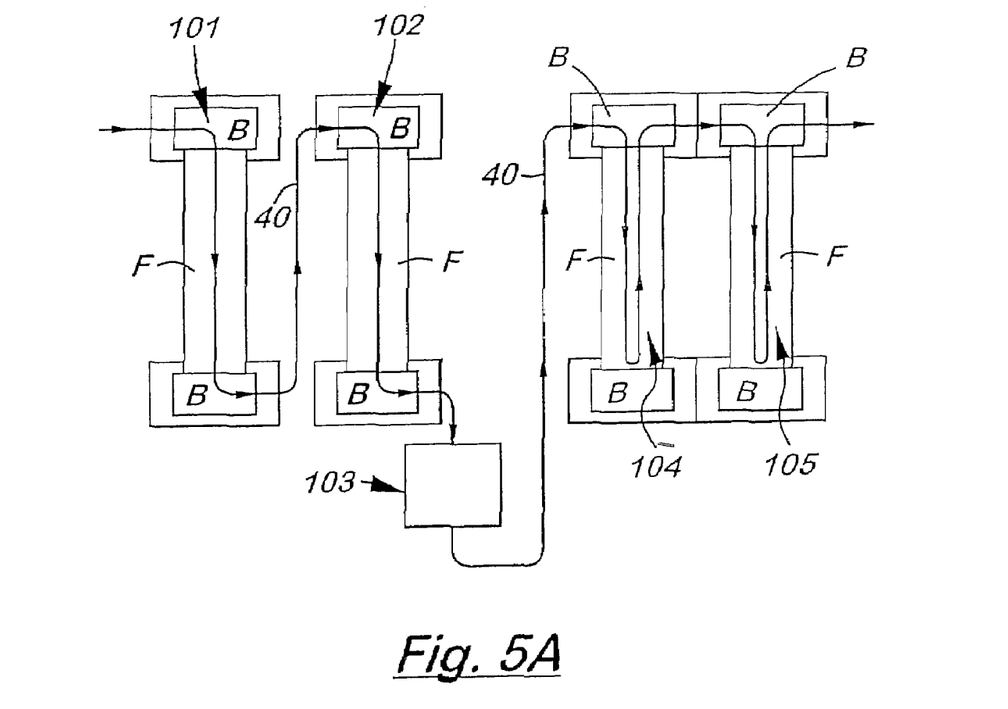
FIG. 5A is a schematic of one embodiment of a flow scheme possible according to the invention, which includes two pairs of brackets with an inlet at the top and an outlet at the bottom and two pairs of brackets with both inlet and outlet in the top bracket, and intermediate storage or treatment.
Figure 5B:
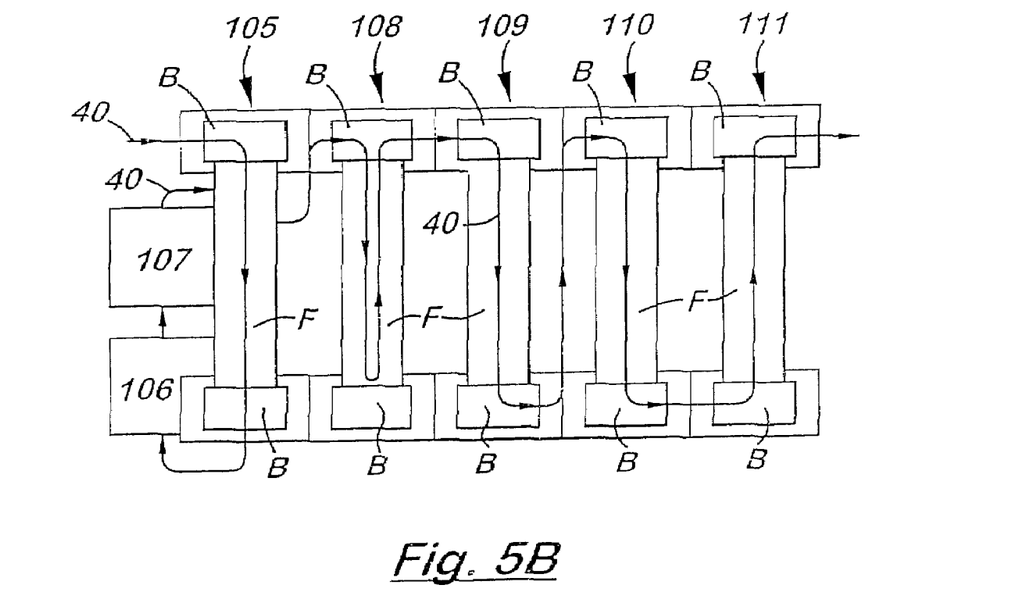
FIG. 5B is a schematic flow diagram of another embodiment of the invention, including five filters in series with intermediate storage/treatment after the first filter, and each filter and its respective brackets featuring a different flow direction and/or fitting location.
Figure 5C:
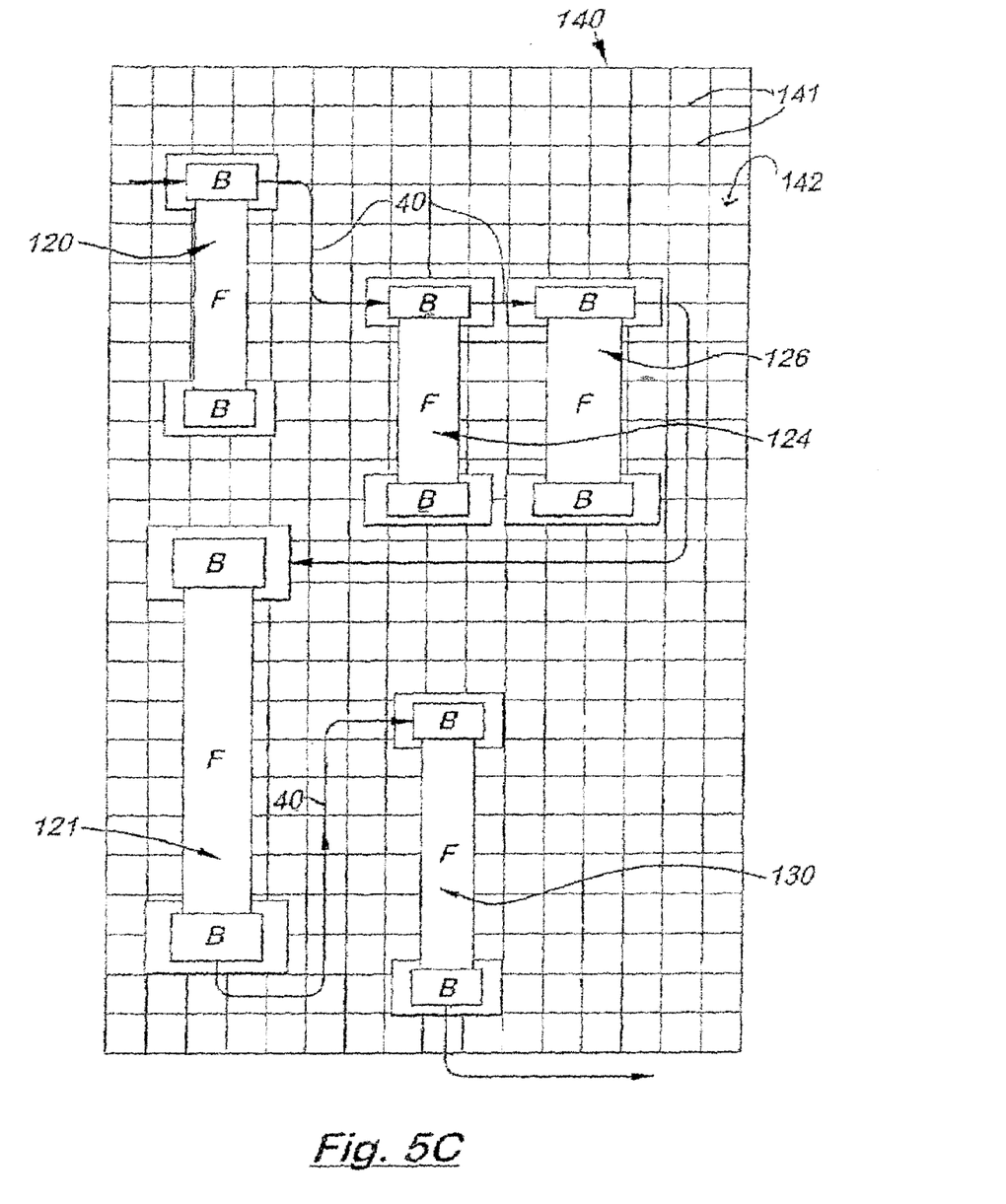
FIG. 5C is a schematic flow diagram of another embodiment of the invention, including five filters in an arrangement wherein the five filters are all on a plane, but not aligned horizontally or vertically.
Figure 14:
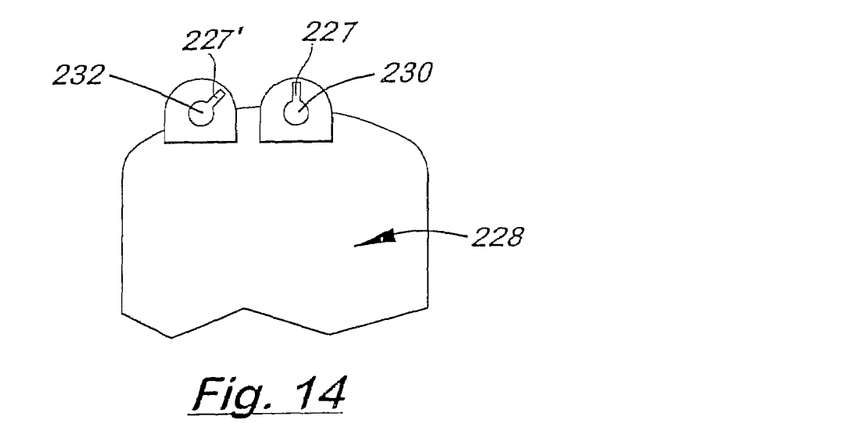
FIG. 14 is a partial side view of one embodiment of a filter cartridge, which is adapted to cooperate with the filter holder of FIGS. 6-13, and which may be called a 0° (right port in the figure) and 60° (left port in the figure) key arrangement or, in other words, a 12 o'clock and 2 o'clock key arrangement.
Figure 15:
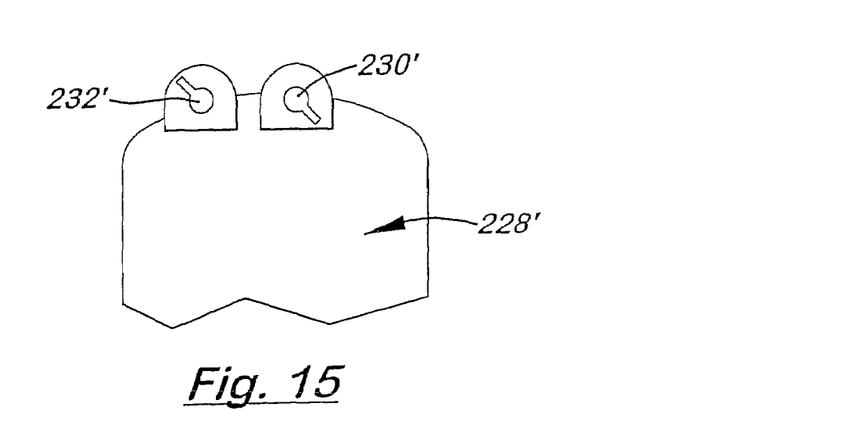
FIG. 15 is a partial side view of a filter cartridge of the type cooperating with the filter holder of FIGS. 6-13, but with an alternatively-angled key system structure, which may be called a 110° (right port) and 290° (left port) key arrangement.
Figure 16:
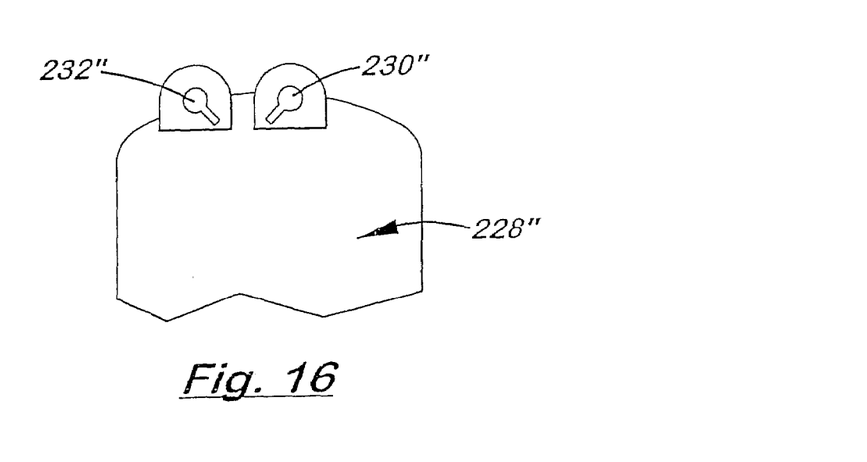
FIG. 16 is a partial side view of a filter cartridge of the type cooperating with the filter holder of FIGS. 6-13, but with an alternatively-angled key system structure, which may be called a 195° and 170° key arrangement.

Referring to the Figures, there are shown several, but not the only, embodiments of invented modular bracket and filter system. FIGS. 1 and 2 illustrates a four-filter system 10 having four pairs of brackets, comprising four top brackets 12 and four bottom brackets 14 that are arranged side-by-side ("aligned") in two parallel horizontal rows. FIG. 3 illustrates a single filter cooperating with a single pair of brackets. FIGS. 5A-5C illustrate other alternative arrangements made possible by the modular system. FIGS. 6-13 illustrate details of preferred components of the invented system. FIGS. 14-16 illustrate various key systems that may be provided as an option on the filters and brackets.

Arrangements for the invented brackets and their cooperating filters may include horizontally aligned, vertically aligned, or non-aligned locations, with a variety of spacing and patterns, as long as the top bracket and the bottom bracket of each pair of brackets are appropriately spaced apart to receive the filter 11. Each pair of brackets may be located generally independently of the others as long as the conduit between them and to/from intermediate storage and treatment is long enough. This allows a great variety of arrangements and spacings, as well as many flowschemes and liquid treatment options, as will be further discussed below.

The invented modular bracket system is especially well adapted for installation on a wall, equipment surface, or other provided preferably generally planar surface. The term "support surface" is used in the claims as the surface upon which the brackets are mounted, and the support surface may be of various designs, shapes, and orientations. For example, it may be a solid wall, a grid, a frame, a surface of a piece of equipment, or various combinations of the above. Therefore, while the Description and Claims may refer to the bracket modules being adapted for connection to "a support surface," or "the support surface," this to not to limit both the top and bottom brackets holding a filter to being on the same surface or to being on a continuous surface. For example, "the support surface" includes embodiments wherein both top bracket and bottom bracket are installed on a single wall, or installed on two different surfaces generally near each other, such as an upper beam and a lower beam, or an upper frame member 13 and a lower frame member 15, or other embodiments for supporting the brackets. Further, while "top bracket" and "bottom bracket" are used herein and in the claims for clarity sake, this does not necessary limit the brackets and the filter to a particular vertical position unless that limitation of verticality or other specific limitations of orientation are clearly included.

As shown in FIGS. 1 and 2, the top bracket 12 comprises at its rear an attachment plate 20 for attachment to a wall or other preferably vertical surface. Connected to the plate 20 are two side-by-side fittings, one for fluid flow into the filter and one for fluid flow out of the filter. Each of the fittings has a first end 22 and a second end 24, wherein the first ends are tubular protrusions extending out from the bracket generally horizontally toward the front of the bracket for connection to the inlet port and outlet port of a filter. The fittings extend back from their first ends 22 and preferably bend at about 90° to turn opposite directions to place their second ends 24 at opposite sides of the bracket. The second ends 24, in the preferred embodiment are near the attachment plate 20 and open in opposite directions on the same or similar axes.

The second ends 24 are adapted for connection to fluid conduit 40 (not shown in FIGS. 1, 2, and 3, but shown in FIGS. 4B, 5A, and 5B), which is preferably flexible tubing, but may also be a rigid tube, pipe, or other connector. Flexible tubing is normally used for flow schemes in which the conduit runs from the top bracket to some location other than another top bracket immediately adjacent, because the conduit normally includes several bends and curves. For example, the flexible tubing may extend from the first top bracket to a storage tank, and then back to a top bracket or to a bottom bracket. For conduit paths that require few or no bends/curves, rigid or partially rigid conduit is effective. For example, a rigid connector may extend straight from a second end of one top bracket to an adjacent second end of an adjacent top bracket. An example of a rigid tube connector may be two collet-style connectors installed in the second ends of adjacent brackets with the two collets being joined by a short length of pipe or flexible tubing.

In embodiments in which the two first ends 22 are side-by-side and parallel to each other, the two second ends 24 are preferably opposite-facing on the same axis, so that the second ends 24 extend to or near to the outer edges of the attachment plate. Each of the two fittings of the top bracket is preferably isolated from the other (not fluidly communicating with each other except via the filter), in that fluid must flow through one bracket into the filter, and through the filter to reach the other fitting and out to another bracket or separate storage/treatment. Alternatively, if a bracket is temporarily not to be used for a filter, the inventor envisions that a jumper tube or connector may be installed between the two fittings to allow flow from one fitting to the other without going through a filter.

Also, the inventor envisions that, instead of bending at 90°, fittings may extend straight back from the first ends 22 through the attachment plate 20 for connection to conduit 40 behind or passing through the attachment plate 20. This would be practical for embodiments designed to hang on a grid or other non-solid surface that would allow conduit to pass back and forward through the grid.

The top bracket 12 includes a lid 30 pivotally connected to the attachment plate 20, by way of one or more arms rotatably disposed around the fittings near the second ends. The lid 30 is generally an inverted-cup-shape with a top wall 32, side walls 34, front wall 36, and an interior space 38. The lid pivots between a raised position, as indicated at "U" ("for up"), to a lowered position indicated at "D" ("for down"). With the lid in the raised position, the first ends of the fittings and the top end 42 of the filter (especially the inlet port 44 and outlet port 46) are exposed, and the filter may be pulled away from the fittings. In the lowered position, the lid is lowered over the first ends and the filter ports 44,46, in effect, enclosing the fitting-port connection on the top, front, and two sides. In this lowered position, the lid and especially the front wall 36, retains the filter top end 42 in the bracket 12, because it can not be pulled out or fall out from the fittings. Preferably, an elastic band or other biasing member is installed to bias the lid into the lowered position. This way, a person my temporarily raise the lid to remove a filter top end, but, as soon as he/she lets go of the lid, it snaps back down, pivoting relative to the attachment plate and the fittings to rest in the lowered position.

An elastic band 47 is illustrated in the third filter from the left in FIG. 2, as an example of various biasing systems for urging the pivotal lid to the position in which it engages, blocks, or otherwise retains the filter top end. The elastic band 47 may encircle a lower portion of, or a hook on, the attachment plate 20 and extend to and encircle a hook or other portion of the pivotal lid 30 in such an orientation that the lid is urged downward in FIG. 2 relative to the attachment plate. Those of skill in the art, after seeing the Drawings and reading this Description will understand this and other biasing systems that may be incorporated in the top bracket to bias the position of the lid.

Alternatively, the top bracket may include systems other than the pivotal lid to engage the filter top end to limit movement of the filter off of the top bracket until the user purposely removes the filter. Such systems may be said to be various latch systems, which engage, surround, or otherwise contain or partially contain the filter top end. The latch system does not necessarily have to pivot down onto the filter to end, but, rather, may include embodiments in which a member swings, slides, pivots, snaps or otherwise moves from any direction toward the filter to hold it in the preferred position.

The bottom bracket 14 that is adapted for cooperation with the double-fitting top bracket discussed above does not necessarily need to include a fitting for connection to a port. Because both inlet and outlet fittings, in such an embodiment, are positioned at the top bracket, the bottom bracket need only be a support system for the bottom end 52 of the filter. For such embodiments, the base 54 and its post 56 do not carry fluid or convey fluid to conduits or other filters or vessels, but rather serve for support, alignment, and securement of the filter. The base 54 portrayed in FIGS. 1 and 2 includes a post 56 that may be received in an indentation in the bottom of the filter for alignment of the filter in the base, but in an embodiment in which the filter top end 42 includes both inlet and outlet ports 44,46, the indentation is not a port and the indentation, and therefore the post, are not in fluid communication with the filter.

Alternatively, the inventor envisions that a filter and bracket system according to this invention may even employ three ports, that is, for example, one inlet port, an intermediate port that takes liquid to an intermediate storage and back again, and a third port as an outlet to downstream processing. This may be accomplished by using two ports at one end of the filter, and one at the bottom, for example.

For supporting the opposite end of the filter, the bottom bracket 14 is provided. The bottom bracket 14 has a rear attachment plate 60 for attachment to the vertical wall and two spaced arms 64, 64' that extend out from the plate 60. Pivotally connected to the arms 64, 64' is the base 54 with a bottom wall 66 and a side wall 68 surrounding and defining an interior space 70 for receiving the bottom end 52 of the filter. The base 54 is biased by an elastic band 147, schematically shown in FIG. 4A, or other biasing member to remain in a position with the base generally on a horizontal plane and vertically receiving the filter.

When force is applied to pivot the base, it pivots on a horizontal axis that is parallel to the plate of the bracket, to a tilted position slightly outward away from the plate. This pivoting typically occurs when the filter top end is pivoted out slightly away from the top bracket so that the filter clears the top bracket when lifted up out of the bottom bracket (see two filters on left of FIGS. 1 and 2). In some embodiments, it is envisioned there may be room for some pivoting of the filter bottom end relative to the base, but, in most embodiments, it is preferred that the filter have a close fit in the base and is not pivotal relative to the base. Therefore, when the filter is tilted outward, the base pivots outward with it, typically about 15-25° from a vertical plane, optionally about 15-45° from a vertical plane. Preferably, the filter does not, or cannot, tilt out farther than 45 degrees before being lifted upward, and, hence, the filter may be considered to be removed from the bracket system of this invention "in a vertical fashion" or "vertically," rather than horizontally. The filter is then lifted up out of the base at that angle relative to vertical, which may reasonably be considered generally vertically. The preferred biasing member returns the base to its upright position after the filter is removed.

For alternative embodiments, in which the filter top and top bracket have only one fitting and port 44, or no fittings or port, the bottom bracket is adapted to carry and direct fluid in and or out of the filter. In embodiments in which the bottom bracket includes one fitting for a filter port, the bottom bracket preferably includes tubular post 56 in the center of the base, as illustrated by FIG. 3. The post upends into the interior space to be slidably received in a port in the filter bottom end 52 The post upends perpendicularly from the base bottom surface, to be vertical when the base is in its upright position. The port into which the post is received runs axially into the filter, preferably at the central axis of the filter. The post's axial fluid passage 70 is thereby placed in fluid communication with the filter and serves as a fitting for connection to conduit for conducting fluid to/from the filter.

An effective system using a fluid-conducting bottom bracket is to have fluid enter the filter top end via a top bracket fitting and a top inlet port 44, flow down through the filter 11 either in axial and/or radial flow to a bottom outlet port. From the bottom outlet port, fluid flows into the hollow post 56 in the base, to a conduit 40 that conducts the fluid to another bracket (either top or bottom) or intermediate storage or treatment. Alternatively, the post may serve as an inlet to the filter, which would then be an up-flow filter.

Alternatively, the bottom bracket may include both an inlet and an outlet fitting, for embodiments in which the top bracket does not include any fluid fitting or conduit. This could be accomplished by providing two vertical posts upending from the base and in fluid communication with an inlet and outlet port in the bottom end of the filter, for example, an inlet offset from the central axis of the filter and the outlet at the central axis of the filter.

Figure 4A:
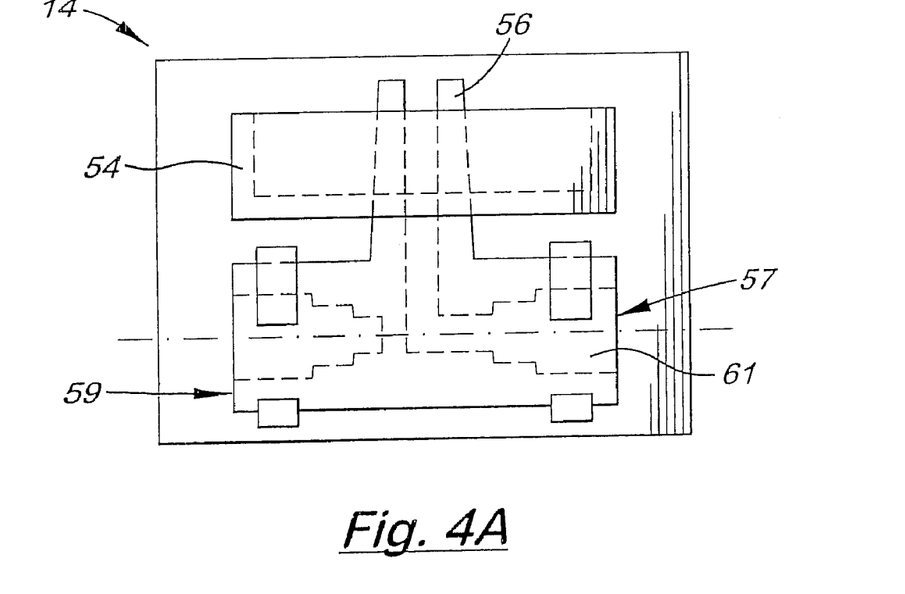
FIG. 4A is a schematic front view of one embodiment of a bottom bracket, including one side-extending fitting and a blocked opposite-side fitting.
Figure 4B:
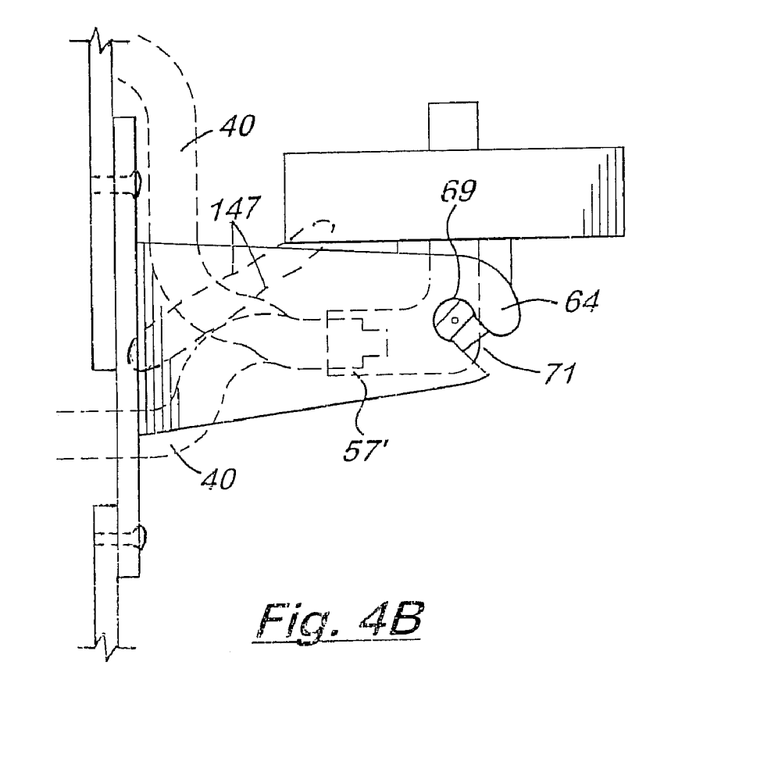
FIG. 4B is a schematic side view of another embodiment of a bottom bracket with one rearward-extending fitting and flexible tubing illustrated as extending in two alternate directions.

As illustrated schematically in FIGS. 4A and 4B, the post 56 represents the first end of the bottom bracket fitting, and the bottom bracket fitting further includes a second end 57 adapted for connection to the conduit 40. Various fitting styles may be provided on the bottom bracket fitting second ends 57. FIG. 4A illustrates schematically a bottom bracket 12 with a fitting extending from its first end (post 56) to bend about 90° to open at its second end 57 at the side, generally parallel to the second ends 24 of the preferred top bracket. In this embodiment, the fitting second end 57 and a protrusion 59 opposite the second end both pivot in the arms, so that the pivotal axis extends through the central cavity 61 of the fitting second end. In this embodiment, the second end 57 is a connection/port for connection to a fluid conduit, and also is pivotally received by arms of the bottom bracket system, so that the second end 57, in effect, is an axle member or pivotal member. At the opposite end of the "axle" is the protrusion end 59, which, in this embodiment does not serve as a fluid conduit, but rather as part of the pivotal axle for the bottom bracket.

FIG. 4B shows an embodiment in which the fitting second end 57' extends in an L-shape rearward and transverse to the pivotal axis. In such an embodiment, the fitting second end 57' conveniently connects to a flexible tubing 40 that extends back through the plate 60, or through a grid wall. Or, the tubing may extend up to loop up to a top bracket of the adjacent filter or to intermediate storage/treatment. In the embodiment of FIG. 4B, the second end 57' does not serve as an axle member, but rather a pivotal axle (pivotal member 67) is provided.

Several of many flow schemes are possible with the invented system shown schematically in FIGS. 5A, 5B, and 5C. For example, FIG. 5A illustrates a configuration in which two series-flow filters 101, 102 in brackets, according to the invention, process a fluid, which then exits from the second filter and flows to an intermediate treatment step 103 not involving one of the filters and at a distance from the filters. After this treatment step 103, the fluid flows to a second bank of two filters 104, 105, and brackets according to the invention, for further processing. All of the four filters according to the invention in FIG. 5A are aligned generally side-by-side, that is, aligned generally "horizontally," for example, on a vertical wall or grid, while the intermediate treatment may be located at a significant distance or near the filters, but not necessarily horizontally aligned with the filters. The first two filters in FIG. 5A are down-flow, top-inlet-port and bottom-outlet-port filters, while the last two filters have both inlet and outlet ports at their top ends.

FIG. 5B illustrates a bank of five filters 105, 108, 109, 110, 111 which are aligned horizontally on a wall or grid. The fluid flows through the first filter 105 in a down-flow pattern (top-inlet-port and bottom-outlet-port) and then to two non-filtration treatment steps, 106, 107. Then, the fluid flows to the second filter 108, which has both inlet and outlet ports at its top end, to filters 109 and 110, which have inlets at their top ends and outlets at their bottom ends, and, finally, to filter 111, which is an up-flow filter having its inlet at its bottom end and outlet at its top end. The fluid conduits may be rigid piping, or may be flexible tubing, as convenient.

FIG. 5C illustrates a filter arrangement in which a plurality of filters are aligned vertically (120, 121, filters of different lengths, for example) and a plurality are aligned horizontally (124, 126, filters of different diameters, for example) and another (130) is not aligned with the others either vertically or horizontally. The filter and bracket systems of FIG. 5C are attached to a grid/grating wall 140, which provides rigid portions 141 for connection of the attachment plates and apertures 142 for strapping or fastening of flexible tubing as fluid conduit.

In FIGS. 5A-5C, the various brackets according to the invention are noted as B, and the filters are noted as F, wherein the fluid conduit is noted as call-out number 40. The brackets may be adapted as appropriate to match the desired type of filter ports and may be adapted to cooperate with the desired type of conduit, whether rigid piping, collet-style connections, or flexible plastic tubing, for example.

As suggested by FIGS. 5A-5C, filters of many designs and contents may be used with the invented bracket system. For example, down flow (either radial and/or axial), up flow (either radial and/or axial), or central return tube styles with both inlet and outlet at one end may be used. Many filtration and treatment media may be used including carbons, bolides, blocks, granules, fibrous, or other materials and/or even media void spaces. The invented brackets may be moved in location and adapted in size and shape and fitting style to fit various filter diameters, lengths, and designs, as suggested by FIG. 5C.

The base 54 of the bottom bracket illustrated in FIGS. 1, 2 and 4B is preferably removable from the plate, by means of a snap-in or slide-in connection between the base and the arms 64, 64'. As shown in FIGS. 1 and 4B, the pivotal members 67 received in holes 69 in the arms are flattened. When the base is pivoted about 90°, the flattened pivotal members 67 align their lengths with the slot opening 71 leading out from the holes in the arms, and can then slide out of the arms. This feature, or other removable adaptation, allows one to remove the base with its fitting for maintenance or replacement.

Preferred Embodiment of Top Bracket:

FIGS. 6-12 illustrate a particularly preferred version of a piece of the top bracket 12, with tubular connectors for connecting to a filter cartridge top. Bracket member 210 is the piece that seals with, and fluidly-communicates with, a filter cartridge at its top end. It is the two tubular connectors, therefore, that create a physical connection and fluid communication between the bracket and cartridge, and the lid 30 (not shown in FIGS. 6-12) helps lock the filter onto the tubular connectors. The tubular connectors are designed to extend out from the bracket, generally horizontally when the bracket is attached to a vertical wall, for example. Thus, the tubular connectors are preferably perpendicular to the longitudinal axis of the preferred filter.

Preferably, the fit between the inlet and outlet tubular connectors and the cooperating ports on the filter are slide-on, frictional connections, tight enough that the filter does not tend to come off the tubular connectors, but the lid acts as a further obstacle to this happening. The bracket member 210 shown in FIG. 6-12 includes both inlet and outlet tubular connectors, for conducting fluid both into and out of the filter cartridge. Thus, the bottom bracket corresponding to such an embodiment would not include any fluid communication ports/tubular connectors, unless the filter was adapted to have a total of three ports, as described above.

The bracket 210 shown in FIGS. 6-12 includes, as an option but not a necessity, a keyed system to control what filters are inserted into particular brackets. The keyed system includes tabs that protrude from the inlet and outlet tubular connectors that would be part of a keyed system, to make the tubular connectors' outer surface not perfectly cylindrical, wherein the protruding tabs would be sized to fit into correspondingly positioned and properly sized slots in the inner surface of the filter cartridge ports. Thus, the tabs of the tubular connectors (shown in FIGS. 6-13) and the slots (shown in FIGS. 14-16) of the filter cartridge ports, therefore, may form a "key system" which can be used to keep unauthorized or improper filter cartridges from being placed on a particular bracket 210. For various sets of brackets and their proper filter cartridges, the tab and slot location/position would be differently arranged, so, for example, a "Type A" filter cartridge could only be inserted into a "Type A" bracket, and a "Type B" filter cartridge could only be inserted into a "Type B" bracket. Type A could be a pre-filter, for example, and its tab and slot could be positioned, for example, at "one-o'clock on the tubular connectors and ports. Type B could be a microbial treatment filter cartridge, for example, and its tubular connectors and ports, for example, could be positioned at "four o'clock". Thus, by placement of the Type A and Type B brackets in a particular order, one could ensure that the cartridges are always in the correct order.

Figure 6:
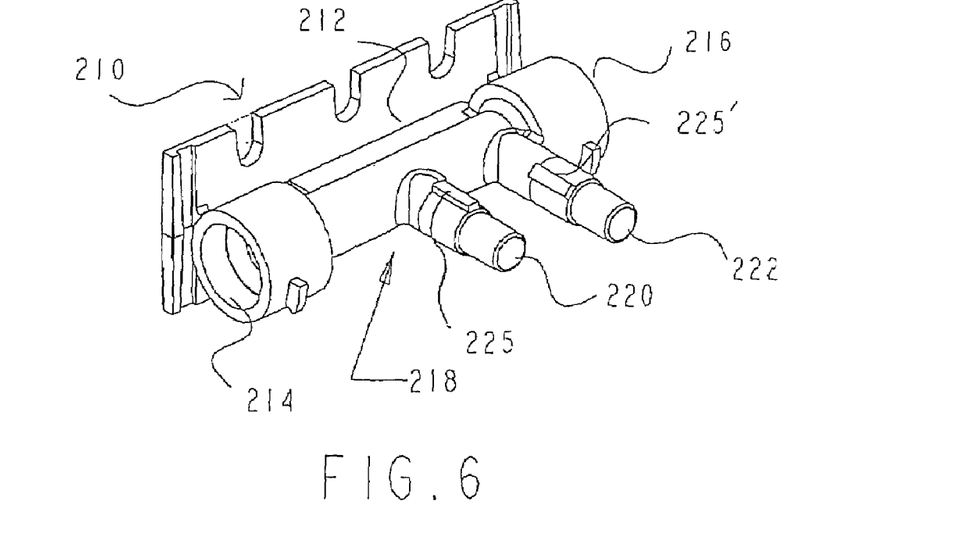
FIG. 6 is a perspective view of an alternative embodiment of a filter holder, a bracket with keyed structure on connection tubes that connect to and fluidly seal to an embodiment of a filter cartridge according to the invention having cooperating inlet and outlet ports.

In FIG. 6 is shown the bracket 210 that serves several functions: mounting means for securing the bracket to a wall of other surface, fluid receiving means, inlet tube for conveying liquid to the filter connected; outlet tube for conveying liquid from the filter; and fluid dispensing means for sending the filtered/treated liquid downstream to another filter, process, storage, or use. Specifically, plate 212 may be attached to a wall or other surface for supporting several brackets in various flow configurations. Inlet 214 and outlet 216 are at opposite ends of a conduit device 218, and may be used so that inlet 214 receives fluid from an upstream pipe or other conduit and that outlet 216 delivers filtered fluid (that has exited the filter cartridge) to its downstream destination. The conduit device 218 directs flow into the inlet tube 220 so that the fluid may flow into the filter cartridge, and then receives flow from the cartridge into the outlet tube 222 so that it may flow out through outlet 216.

Figure 7:
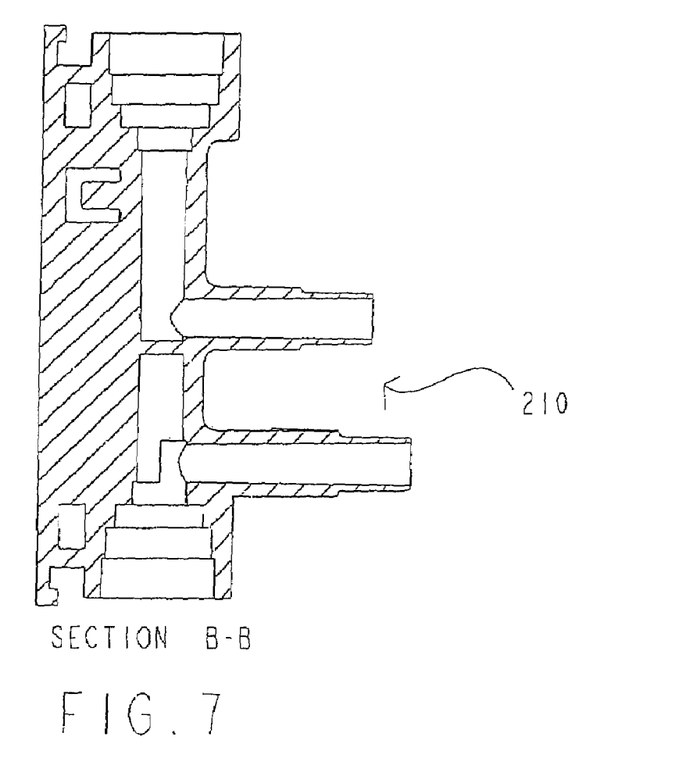
FIG. 7 is a bottom, cross-sectional view of the filter holder of FIG. 6, viewed along the lines B-B in FIG. 8.
Figure 8:
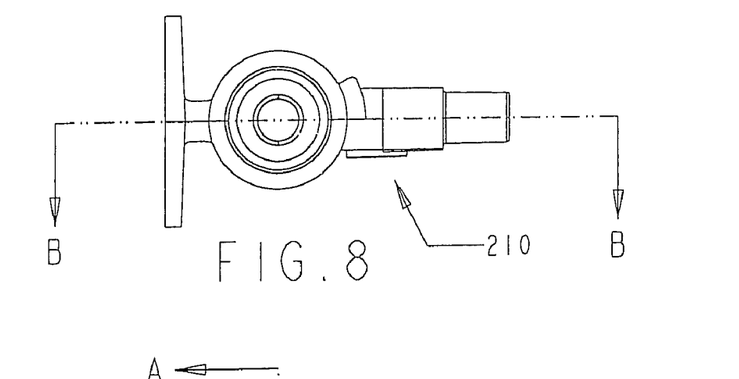
FIG. 8 is an end view of the filter holder of FIGS. 6 and 7.
Figures 9, 10:
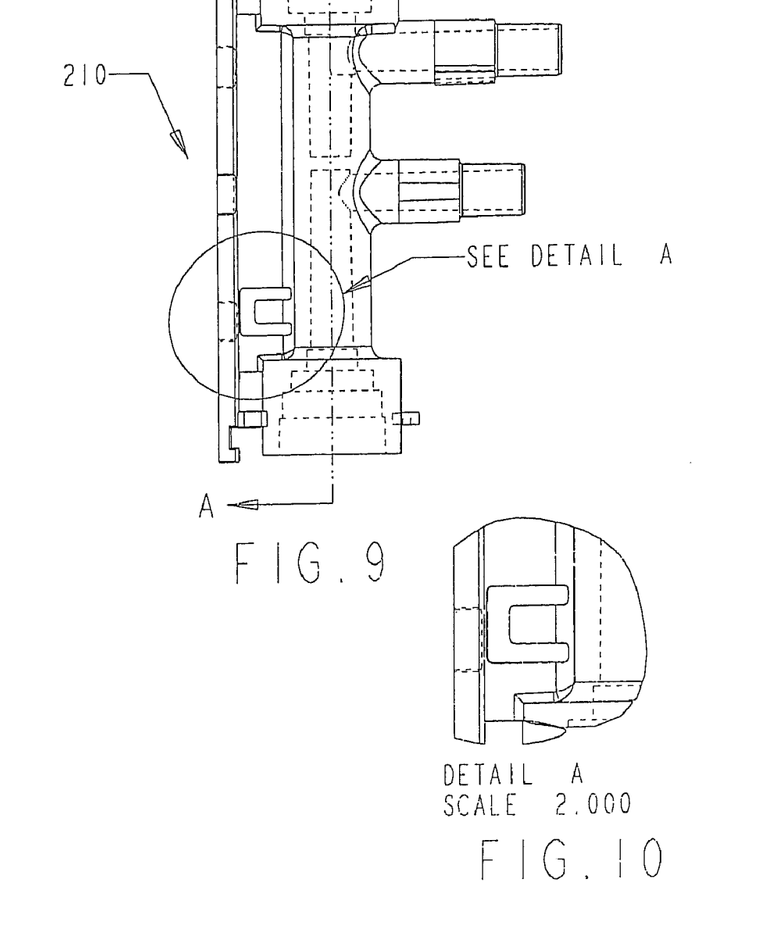
FIG. 9 is a top view of the filter holder of FIGS. 6-8.
FIG. 10 is a detail view of Section A of FIG. 9, of the filter holder of FIGS. 6-9.
Figure 11:
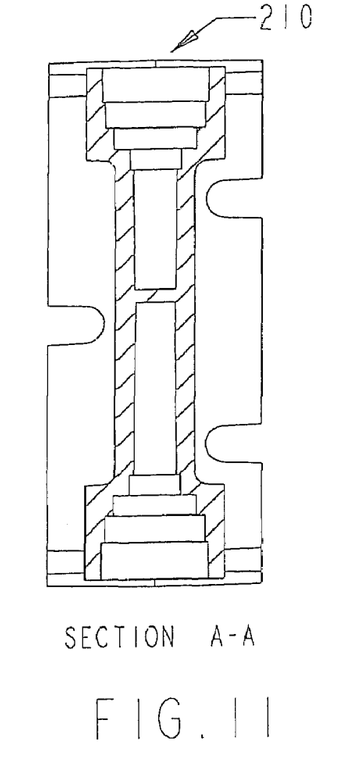
FIG. 11 is a front, cross-sectional view of the filter holder of FIGS. 6-10, viewed along the line A-A in FIG. 9.
Figure 12:
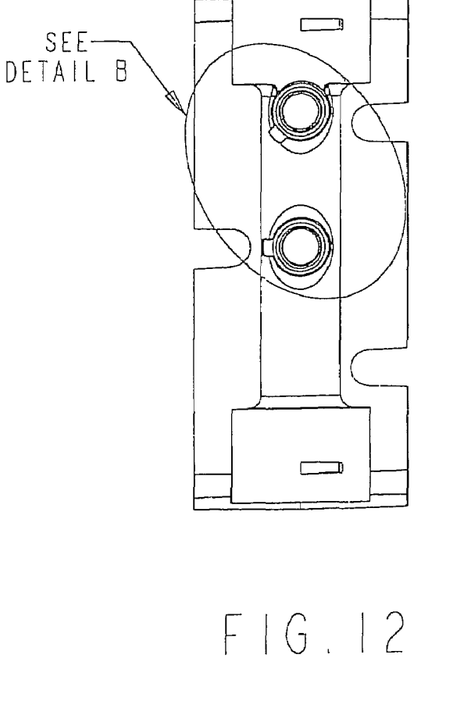
FIG. 12 is a front view of the filter holder of FIGS. 6-11.
Figure 13:
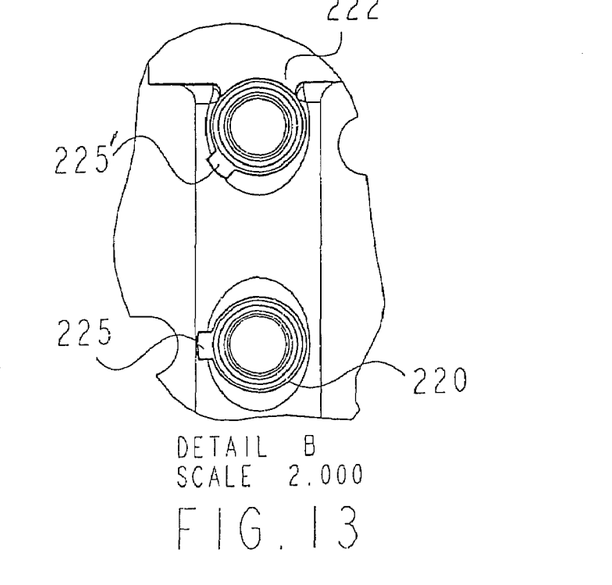
FIG. 13 is a detail view of the inlet and outlet tubes of the filter holder of FIGS. 6-12, viewed as detail B of FIG. 12.

As part of the preferred, but not necessary, key system, male tubes 220 and 222 have "stand out" or tabs 225,225' on their outer cylindrical surfaces for a key system, such as discussed above, which are preferred but not required. As best seen in FIGS. 6 and 7, tube 220 and tube 222 have tabs 225, 225' protruding about 30 degrees offset from each other (tab 225 of tube 220 out to the left in FIG. 14 and tab 225' of tube 222 down about 30 degrees from the tab 225 of tube 220). The cooperating filter cartridge 228 shown schematically in FIG. 15 has female inlet and outlet tubes 230 and 232 (which may also be called an inlet port and outlet port), and one may notice that tubes 230 and 232 have matched or "mating" internal slots 227, 227' to receive the tabs 225, 225'. Alternatively, of course, filter cartridges might be made with male tubes and tabs and cooperating holders may be made with female tubes and slots.

The bracket 10 in FIGS. 6-13 typically is installed in a process with the plate 212 vertically attached to a vertical wall. Thus, tubes 220 and 222 extend out horizontally, and the filter cartridge is pushed onto the tubes 220, 222 so that the tubes 220 and 222 support and connect with the filter cartridge. Associated with the tubes 220, 222, 230, 232 are o-rings or other sealing structure to provide liquid-tight communication between the bracket and the cartridge. Although it is not shown, one may see from FIGS. 6-13 that liquid-tight seals are made between piping or other conduit and the inlet 214 and outlet 216. Additionally, a fastening device may be added to further secure the cartridge in sealed relationship with the tubes 220, 222, such as lid 30.

One may see that, by varying the radial location of the tabs and slots, one could arrive at many "keys" and "locks" for the cartridge-holder sets. For example a holder could have an inlet tube with a tab at 60 degrees from a reference point and the outlet tube could have a tab at 120 degrees relative to that reference point, as long as the proper cartridge for that holder is made with the same offset and the same absolute location of slots. FIGS. 6-14 illustrate only one set of the many possible combinations of possible tab radial locations, which are extremely numerous because the radial location of each of the tubes may be varied in each set, and may be varied independently. FIGS. 15 and 16 illustrate two of the many other possible key system structures. For example, in the top end of elongated filter cartridge 228' of FIG. 15, the female inlet tube (port) 230' is keyed at about 110 degrees, and the female outlet tube (port) 232' is keyed at about 290 degrees. In the top end of elongated filter cartridge 228" of FIG. 16, the inlet tube 230" is keyed at about 195 degrees and the outlet tube 232" is keyed at about 170 degrees.

The bracket 10 in FIGS. 12-19 typically is installed in a process with the plate 212 vertically attached to a vertical wall. Thus, tubes 220 and 222 extend out horizontally, and the filter cartridge is pushed onto the tubes 220, 222 so that the tubes 220 and 222 support and connect with the filter cartridge. Associated with the tubes 220, 222, 230, 232 are o-rings or other sealing structure to provide liquid-tight communication between the bracket and the cartridge. One may understand from FIGS. 12-19 that liquid-tight seals are made between piping or other conduit and the inlet 214 and outlet 216. Additionally, a fastening device (or "latch system") may be used to further secure the cartridge ports in sealed relationship with the tubes 220, 222.

Although this invention has been described above with reference to particular means, materials and embodiments, it is to be understood that the invention is not limited to these disclosed particulars, but extends instead to all equivalents within the scope of the following claims.

I claim:

1. A combination of a water filter and a filter holder that supplies water to said filter,
    wherein the filter comprises:
        two side-by-side liquid ports; and
    wherein the filter holder comprises:
        two side-by-side liquid connectors that fluidly seal to said liquid ports of the filter; and
    wherein the combination comprises a key system selected from the group consisting of: a key tab extending out from a cylindrical outer port surface that mates with a slot in a cylindrical inner surface of said liquid connectors, and a slot in a cylindrical inner port surface that mates with a key tab extending out from a cylindrical outer connector surface of said liquid connectors.

2. The combination of claim 1 wherein the two side-by-side liquid ports are co-planar on a plane perpendicular to a longitudinal axis of the filter.

3. The combination of claim 1, wherein the two side-by-side liquid ports are located at a top end of the filter.

* * * * *